Patented Aug. 8, 1950

2,518,148

UNITED STATES PATENT OFFICE 2,518,148

POLYAMIDE POLYMERS AND PROCESS FOR PREPARING SAME

Wesley A. Jordan, Sydney H. Shapiro, and Julius M. Schrager, Chicago, Ill., assignors to Armour and Company, Chicago, Ill., a corporation of Illinois No Drawing. Application December 29, 1944, Serial No. 570,470

12 Claims. (Cl. 260—18)

This invention relates to polyamide polymers and processes for preparing the same. More particularly, the invention deals with the preparation of such compounds from high molecular weight polyene fatty acid substances and relatively low molecular weight aliphatic diamines.

We have discovered that improved resinous compositions can be formed by reacting a high molecular weight polyene fatty acid substance, such as linoleic acid, and a relatively low molecular weight aliphatic diamine, such as ethylene diamine, to form a diamide, and then heating the diamide so formed to polymerize it. We find that the resulting resinous compounds are hard, have a high melting point, and have excellent protective coating properties.

In carrying out our invention we may first perform the reaction between the polyene fatty acid substance and the diamine. In this reaction we may use any high molecular weight polyene fatty acid of 8 or more carbon atoms such as linoleic, linolenic, elaeostearic, and 9,11 octadecadienoic acids and the $C_{20}$, $C_{22}$, $C_{24}$ and $C_{26}$ polyene fatty acids. We may also use the esters, acid anhydrides and acyl-halides of such fatty acids. The acids, their esters, acid anhydrides and acyl-halides are herein called fatty acid substances.

The fatty acid substances may be obtained from any suitable source. The vegetable and marine oils are good sources and the polyene acids from such sources vary from 14 to 26 carbon atoms. The following oils are deemed of special importance: dehydrated castor, linseed, China-wood, soya bean, sunflower and cottonseed oils, and sardine, herring, whale and menhaden fish oils. Hydrolysis of such oils as these yields an acid mixture which contains the desired polyenic acids. This mixture may be reacted with the diamine to carry out our invention, but preferably these acid mixtures should first be subjected to a fractional separation treatment to remove at least a portion of the saturated and mono-unsaturated acids. This pretreatment step may involve cooling the acid mixture, preferably while admixed with a solvent such as acetone, methyl alcohol, propane, hexane or liquid ammonia, until a portion crystallizes, and then removing the crystallized portion. The uncrystallized portion may be freed of solvent and reacted with the diamine.

We further find it advantageous to use polyene acid substances having double bonds in conjugated relation, such as elaeostearic acid and 9,11 octadecadienoic acid. Improved products may be made using the acids of castor oil by subjecting the acids to a dehydration process to thereby convert the acids to a substantially conjugated polyenic system.

As the diamine we prefer to use ethylene diamine though other aliphatic diamines such as propylene diamine, tetramethylene diamine and pentamethylene diamine may be used.

The fatty acid substances and the diamine may be placed together in a suitable kettle or still using two moles of acid substances to one mole of diamine. Preferably, the reactants are blanketed with an inert gas such as carbon dioxide. Heat is applied and the temperature of reaction gradually increased to 150° C. or more. There is substantial foaming especially while the temperature is being raised to about 120° C. The rate of increase in temperature may be gauged by the amount of foaming produced. Usually about all the foaming will have subsided when the temperature reaches 150° C. When the foaming has subsided the reaction to form the diamide is deemed substantially complete and the reaction mass is ready for the polymerizing step.

Where the foaming of the reactants presents a difficulty, this may be substantially avoided by slowly adding the diamine to the acid substances during the heating period, preferably adding the last of the diamine as the mass approaches about 150° C. In this way it is possible to operate with very little or no foaming.

In conducting the polymerizing step, the reaction mass, which now contains diamides, is heated to a temperature substantially higher than necessary for the acid-diamine reaction, usually from 250 to 350° C. Desirably, the diamide may be heated as rapidly as practicable to a temperature of about 300° C. and held in the neighborhood of 300 to 310° C. from four to six hours.

Improved resins are had if distillation equipment is employed and the material held under reduced pressure during the polymerization step. For example, the pressure of the material may be held at from 4 to 8 mm. of mercury. In maintaining the reduced pressure, products of decomposition may be drawn off and this removal contributes to the quality of the final product.

Further improvement is had by steaming the material during polymerization. This may be accomplished by introducing steam through a spider at the bottom portion of the vessel. The effect of the steam treatment is to purge the material undergoing polymerization to remove unwanted reaction products.

After the reaction product has been held for a period such as four or five hours at the polymerizing temperature, it may be cooled and employed as a coating composition or used for other purposes.

Yet further improved products can be prepared by reacting the polyamide polymers with an aldehyde. This reaction may be accomplished by melting the polyamide polymers and adding thereto from about 2% to 5% by weight of an aldehyde such as paraformaldehyde. Agitation may be used to maintain the aldehyde dispersed in the polymers. The mass may be heated to 115° C. or more and held at such temperature for an hour or more until such reaction is complete. Some foaming may occur as the temperature is raised and for this reason it is desirable to heat the mixture slowly. On cooling, the product is found to have excellent heat sealing, thermoplastic and elastomeric properties.

Instead of paraformaldehyde we may use, for example, formaldehyde, paraldehyde, aldol, glyoxal, formisobutyraldol, furfural, acrylic aldehyde, aldehydic sugars, and formaldehyde-releasing substances such as hexamethylenetetramine, paraformaldehyde being of special importance and especially valuable in connection with the polyamide polymers. For convenience, paraformaldehyde is preferred rather than formaldehyde, the latter being a gas and hence more difficult to handle.

Other desirable reaction products can be prepared by reacting the polyamide polymers with maleic anhydride. This reaction can be accomplished by mixing with the polyamide polymers from 2% to 10% by weight of maleic anhydride and heating to 240° C. or more, holding the mixture at this temperature for from one to three hours to complete the reaction. Foaming usually accompanies the reaction and when this subsides the temperature may be dropped and a further quantity of ethylene diamine admixed. This mixture may be heated to 200° C. or more and held at such elevated temperatures for from one to two hours. The resulting product is hard and dry and somewhat brittle.

The maleic anhydride reaction products prepared as above described can be improved by reacting them with aldehydes. This is accomplished by adding 2% to 5% by weight of the aldehyde to the maleic anhydride reaction product and heating slowly to above about 130° C., maintaining this temperature for an hour or more to complete the reaction with the aldehyde. The resulting resinous product is tough and hard.

Specific examples of the practice of our invention are as follows:

Example I

The equipment used is a stainless steel vessel which is equipped with an agitator, reflux condenser and facilities for the admission of carbon dioxide and steam. The vessel is jacketed, providing a chamber through which heating fluid is circulated.

560 pounds of fatty acids obtained by hydrolysis of linseed oil are placed in the vessel along with 94.3 pounds of 70% ethylene diamine. There is a considerable heat of reaction and the temperature may rise to 80° C. The agitator is started and heat is carefully applied to raise the temperature of the mixture to 120° C. Foaming is controlled by slowly advancing the temperature and also by means of mechanical foam beaters attached to the agitators. The temperature is then slowly advanced to 150° C. over a period of approximately one hour. When held at 150° C. for one hour the foaming subsides and the water of reaction is substantially removed. The temperature of the mixture is then raised to 300° C. in approximately one hour. The mixture is maintained at 300° C. for 4 to 5 hours during which time the bodying procedure takes place. At the end of the bodying period the vessel is placed under a vacuum of about 20 mm. pressure and steam is admitted through a spider which is located on the floor of the vessel. This purges the contents of the vessel, liberating unwanted reaction products and thereby improving the hardness and odor of the resin. The purging operation can be accomplished in 45 minutes to an hour. The resinous material so formed is then cooled and carbon dioxide gas is run through the mixture instead of steam. When the resin has cooled to 150° C. the vacuum is broken by admitting to the system until atmospheric pressure is reached. The product is then taken from the still.

Example II

Instead of removing the resinous product from the still at the end of Example I above, 29.2 pounds of paraformaldehyde are added and mixed in with the resinous product. Heat is again applied and the temperature gradually advanced to 130° C. and held at this temperature for about one hour. The temperature is then further advanced to 250° C., this temperature being maintained for approximately an hour. The product is then cooled to a temperature of about 150° C. and run out into cooling pans. The resulting resin is a hard, cherry-red material which exhibits heat sealing and thermoplastic properties.

Example III

Instead of removing the resin from the still at the end of Example I, there is mixed into the polyamide resin 10% by weight of maleic anhydride. The mixture is agitated and the temperature advanced to 260° C. in one half hour, this temperature being maintained for one hour. Some foaming is experienced and when the foaming has subsided the temperature is dropped to 150° C. and 55 pounds of 70% ethylene diamine is added. The mixture is again heated to about 180° C. and held for one half hour. Upon cooling the product is removed from the still.

Example IV

Instead of removing the resinous product from the still at the end of Example I, there is added 11.7 pounds of maleic anhydride. The mixture is heated to 260° C. and held one hour, after which time it is allowed to cool to 120° C. To the maleic adduct so formed is added dropwise 11 pounds of 70% ethylene diamine which amounts to 10% excess diamine. The mixture is held at 200° C. until reaction is completed and is then cooled to 100° C. when 12 pounds of paraformaldehyde is added. The temperature is then advanced to 130° C. and then slowly raised to 150° C., which temperature is maintained for one half hour. When cooled, the reaction product is poured out and is found to be hard and tough.

Example V

Acids obtained upon the hydrolysis of linseed oil are subjected to solvent extraction by furfural to remove a fraction rich in saturated acids and mono-unsaturated acids and the remaining fraction containing polyene acids in concentration and having an iodine number of 249 is treated as follows:

1120 grams of the high iodine linseed fatty acids so obtained are mixed with 188 grams of 70% ethylene diamine. The mixture is heated at atmospheric pressure for two hours at 150° C. and over a period of five hours the temperature is advanced to 250° C. In the next hour the temperature is raised to 260° C., in the next two hours the temperature is maintained between 260 and 270° C., and in two additional hours the temperature is maintained at 280° C. The product after cooling is a clear, wax-like resin melting at about 60 to 70° C.

*Example VI*

1120 grams of the high iodine linseed fatty acids prepared by solvent extraction as set forth in Example V are mixed with 188 grams of 70% ethylene diamine. The mixture is gradually heated over a period of 5 hours to 290° C. and maintained for four hours at 290° C. The reaction product is a clear, ruby-red resin.

To this resin there is added 5% by weight of paraformaldehyde with thorough mixing. The mixture is heated to 120° C. in one half hour and held at this temperature for one half hour, after which the temperature is advanced to 250° C. and held one hour. On cooling the resinous product was found to be very hard and to exhibit excellent heat sealing properties.

*Example VII*

Castor oil is saponified with caustic soda and the soap is split with 10% sulfuric acid. The acidulated acids are water-washed until free of mineral acid and then allowed to settle.

6000 pounds of the castor fatty acids so prepared are placed in an esterifier and blanketed with carbon dioxide. The batch is heated to 450° F. and held one hour. Then the temperature is advanced to 500° F. and held one hour, and then advanced to 550° F. and held one hour. At this point there is about 300 to 400 pounds of distillate composed of water, fatty acid and heptaldehyde. The batch is then cooled to 250° F.

To the dehydrated acids is added 850 pounds of commercial 70% ethylene diamine. About ¾ of an hour is allowed to add the ethylene diamine. When approximately 500 pounds of ethylene diamine is added, heat is applied and the temperature slowly advanced to 300° F., reaching this temperature when the final addition of ethylene diamine is made. After having added all of the ethylene diamine the temperature is advanced to 560° F. and held from one to four hours. Vacuum is slowly applied and steam is injected into the batch. The reaction is followed by taking cure points on the resin. When the resin shows a cure point of about 55 to 60 seconds at 250° C., the resin is dumped into pans for cooling, after which it is removed and broken up. The resin may be stored in drums for further use.

The reaction involved in the preparation of the diamide may be described by the following equation:

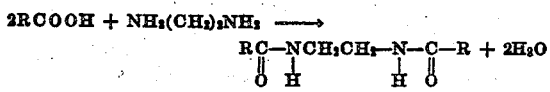

and the polymers of such amides may be illustrated by the following equations. These equations, for purposes of clarity, will describe the preparation of polyamide polymers from diamides derived from linseed oil fatty acids and ethylene diamine.

The diamide of linoleic acid,

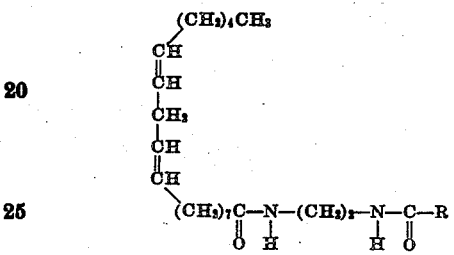

when heated, isomerizes to the diamide of 9,11 octadecadienoic acid,

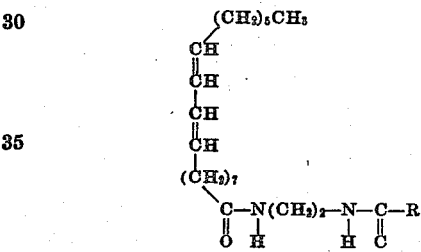

which polymerizes with a second molecule, conjugated or unconjugated, to form the polyamide polymer,

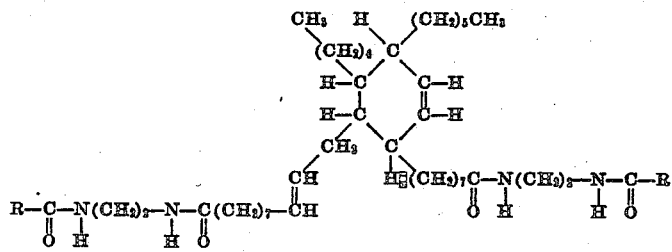

When maleic anhydride or an aldehyde such as paraformaldehyde or both these reactants are introduced in the preparation of further improved products, the molecular structure of the resulting compounds is further modified.

Although the foregoing detailed description has been given with respect to certain specific embodiments, there is no intention to limit the invention thereby, and it is expected that our improvements may be practiced in widely varying ways and using many different source materials, without departing from the spirit of the invention.

We claim:

1. A process for the production of a polyamide polymer, comprising heating to a reaction temperature about one mole of a diamine selected from the group consisting of ethylene diamine, propylene diamine, tetramethylene diamine, and pentamethylene diamine, with about two moles of a polyene monobasic fatty acid of from 8 to 26 carbon atoms to produce a polyamide, and maintaining the polyamide at a temperature of from 250° to 350° C. for a period of about 4 to 6 hours to polymerize the same.

2. The process of claim 1 in which the fatty acid is a drying oil fatty acid.

3. The process of claim 1 in which the fatty acid is 9,11 octadecadienoic acid.

4. The process of claim 1 in which the fatty acid is a dehydrated castor oil fatty acid.

5. A process for the production of a polyamide polymer, comprising heating to a reaction temperature ethylene diamine and a polyene monobasic fatty acid of from 8 to 26 carbon atoms and in the proportion of about two moles of said polyene fatty acid to one mole of diamine to produce a polyamide and heating the polyamide at a temperature of from 250° to 350° C. for a period of about 4 to 6 hours to polymerize the same.

6. A process for the production of a polyamide, comprising heating to a reaction temperature ethylene diamine and a polyene monobasic fatty acid of from 8 to 26 carbon atoms in the proportion of about two moles of said polyene fatty acid to one mole of diamine to produce a polyamide, heating the polyamide at a temperature of from 250° to 350° C. for a period of about 4 to 6 hours to polymerize the same, and further polymerizing the polyamide polymer so formed with maleic anhydride.

7. A process for the production of a polyamide, comprising heating to a reaction temperature ethylene diamine and a polyene monobasic fatty acid of from 8 to 26 carbon atoms in the proportion of about two moles of said polyene fatty acid to one mole of diamine to produce a polyamide, and polymerizing the polyamide so formed with an aldehyde.

8. A process for the production of a polyamide, comprising heating to a reaction temperature ethylene diamine and a polyene monobasic fatty acid of from 8 to 26 carbon atoms in the proportion of about two moles of said polyene fatty acid to one mole of diamine to produce a polyamide, and polymerizing the polyamide so formed with paraformaldehyde.

9. A process for the production of a polyamide, comprising heating to a reaction temperature ethylene diamine and a polyene monobasic fatty acid of from 8 to 26 carbon atoms in the proportion of about two moles of said polyene fatty acid to one mole of diamine to produce a polyamide, and polymerizing the polyamide so formed with maleic anhydride and an aldehyde.

10. The product produced in accordance with the process set forth in claim 6.

11. The product produced in accordance with the process set forth in claim 8.

12. The product produced in accordance with the process set forth in claim 9.

WESLEY A. JORDAN.
SYDNEY H. SHAPIRO.
JULIUS M. SCHRAGER.

REFERENCES CITED

The following references are of record in the file of this patent:

UNITED STATES PATENTS

| Number | Name | Date |
|---|---|---|
| 2,146,210 | Graves | Feb. 7, 1939 |
| 2,149,286 | Graves | Mar. 7, 1939 |
| 2,225,189 | Wayne | Dec. 17, 1940 |
| 2,379,413 | Bradley | July 3, 1945 |
| 2,410,788 | Morgan et al. | Nov. 5, 1946 |

FOREIGN PATENTS

| Number | Country | Date |
|---|---|---|
| 849,348 | France | Aug. 11, 1939 |